(12) United States Patent
Nakayama (10) Patent No.: US 8,446,719 B2
(45) Date of Patent: May 21, 2013

(54) SHOCK-ABSORBING DEVICE, STORAGE MEDIUM HOLDING DEVICE, AND SYSTEM FOR ENCLOSING STORAGE MEDIUM

(75) Inventor: Takaya Nakayama, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 197 days.

(21) Appl. No.: 12/791,381

(22) Filed: Jun. 1, 2010

(65) Prior Publication Data
US 2010/0302724 A1 Dec. 2, 2010

(30) Foreign Application Priority Data

Jun. 2, 2009 (JP) .................................. 2009-133391

(51) Int. Cl.
*H05K 7/12* (2006.01)
(52) U.S. Cl.
USPC ............... 361/679.36; 361/679.32; 312/223.1
(58) Field of Classification Search
USPC .......... 361/679.32–679.38, 724–727, 679.02, 361/679.01; 312/223.1–223.2; 267/140.2
See application file for complete search history.

(56) References Cited

U.S. PATENT DOCUMENTS

| 6,283,438 B1 * | 9/2001 | Shimada et al. ............... 248/694 |
| 7,729,113 B2 * | 6/2010 | Olesiewicz et al. ...... 361/679.34 |
| 8,116,076 B2 * | 2/2012 | Cochrane ................. 361/679.34 |
| 2004/0032710 A1 | 2/2004 | Fujiwara et al. |

FOREIGN PATENT DOCUMENTS

| JP | 10-256740 | 9/1998 |
| JP | 2000-349453 | 12/2000 |
| JP | 2002-352575 | 12/2002 |

* cited by examiner

*Primary Examiner* — Jinhee Lee
*Assistant Examiner* — Ingrid Wright
(74) *Attorney, Agent, or Firm* — Staas & Halsey LLP (57) ABSTRACT

A shock-absorbing device is provided. The shock-absorbing device that absorbs shock to an object includes a shock-absorbing member that surrounds the object and is elastically deformable and a switching mechanism that switches the shock-absorbing member to a flat state where a gap between the shock-absorbing member and the object is small and the shock-absorbing member is flat, or a bent state where the shock-absorbing member is bent toward the outside of the object so that the gap increases.

5 Claims, 7 Drawing Sheets

SLIDING DIRECTION

SLIDING DIRECTION

SHOCK-ABSORBING DEVICE, STORAGE MEDIUM HOLDING DEVICE, AND SYSTEM FOR ENCLOSING STORAGE MEDIUM

CROSS-REFERENCE TO RELATED APPLICATION(S)

This application is related to and claims priority to Japanese Patent Application No. 2009-133391, filed on Jun. 2, 2009, and incorporated herein by reference.

1. Field

The embodiments discussed herein are directed to a shock-absorbing device, a storage medium holding device, and a system for enclosing a storage medium.

2. Background

Technologies to protect an object from shock are disclosed. For example, by surrounding an object with an air cushion, an elastic member, or the like, shock to the object may be absorbed. As a related art, Japanese Laid-open Patent Publication No. 10-256740 is cited.

When carrying or transporting an object, shock to the object is preferably absorbed. However, surrounding an object with a shock-absorbing member increases the size of the object including the shock-absorbing member. When an object is enclosed within another object or placed within another object, the need for shock absorption decreases. For example, when inserting an object into a limited space, a shock-absorbing member may interfere with the insertion.

SUMMARY

It is an aspect of the embodiments discussed herein to provide a shock absorbing device a storage medium holding device, and a system for enclosing a storage medium. The aspect can be attached by a device that absorbs shock to an object including a shock-absorbing member that surrounds the object and is elastically deformable and a switching mechanism that switches the shock-absorbing member to a flat state where a gap between the shock-absorbing member and the object is small and the shock-absorbing member is flat, or a bent state where the shock-absorbing member is bent toward the outside of the object so that the gap increases.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed. These together with other aspects and advantages which will be subsequently apparent, reside in the details of construction and operation as more fully hereinafter described and claimed, reference being had to the accompanying drawings forming a part hereof, wherein like numerals refer to like parts throughout.

DETAILED DESCRIPTION OF THE EMBODIMENTS

Figure 1A:
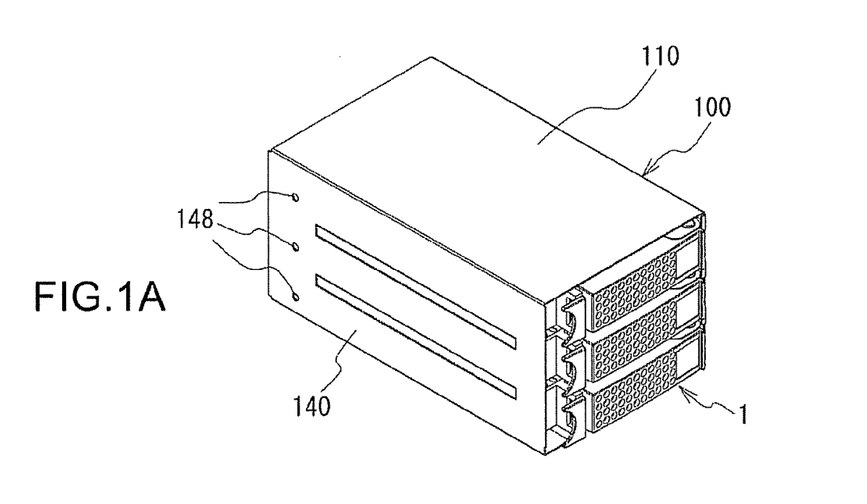
FIG. 1A illustrates a system for enclosing storage media.

As illustrated in FIG. 1A, a system for enclosing storage media includes hard disk units (hereinafter referred to as HDD units) 1, for example three HDD units, and a chassis 100. The HDD units are enclosed in the chassis 100. The HDD units 1 correspond to storage medium holding devices. The system for enclosing storage media is used, for example, in a RAID (Redundant Array of Inexpensive Disks).

Figure 1B:
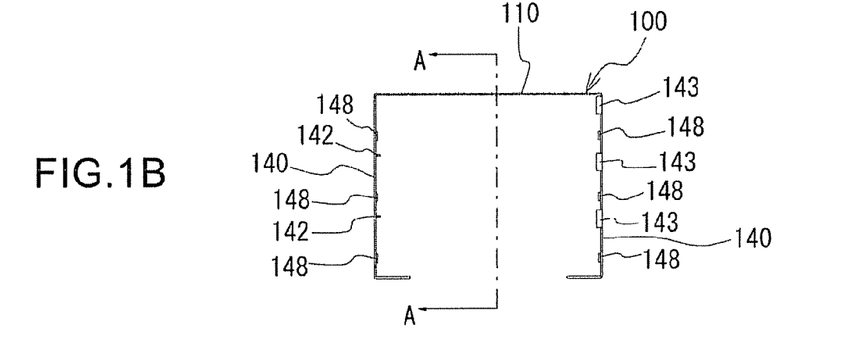
FIG. 1B illustrates a chassis.
Figure 1C:
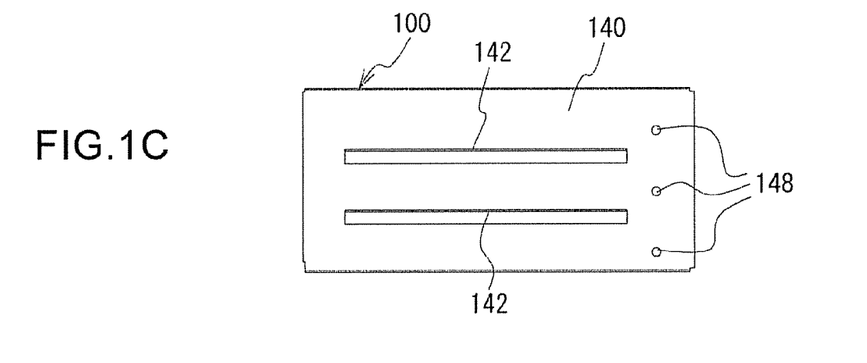
FIG. 1C is a sectional view taken along line A-A of FIG. 1B.

As illustrated in FIG. 1B, the chassis 100 includes a top plate 110 and two side walls 140. On the inner sides of the side walls 140, guide rails 142 and 143 may be provided that guide the insertion of the HDD units 1. In addition, on the inner sides of the side walls 140, protrusions 148 are provided. The chassis 100 is formed, for example, of metal. The protrusions 148 correspond to contact portions. FIG. 1C is a sectional view taken along line A-A of FIG. 1B.

Figure 2:
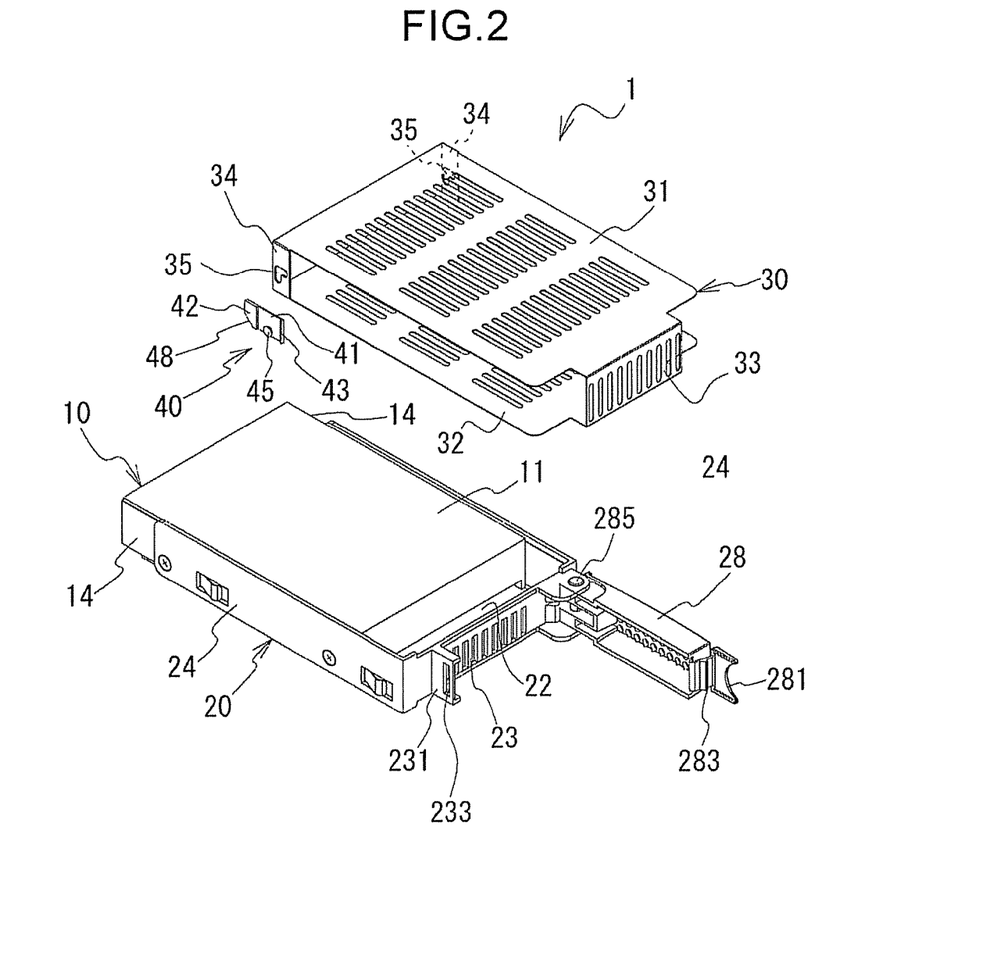
FIG. 2 is an exploded perspective view of a hard disk (HDD) unit.

As illustrated in FIG. 2, each HDD unit 1 includes a hard disk (hereinafter referred to as HDD) 10, a case 20, a shock-absorbing member 30, and multiple (e.g., two) restraining bodies 40, although only one of the restraining bodies 40 is illustrated in FIG. 2. The HDD 10 corresponds to a storage medium. The case 20 holds the HDD 10. The case 20 is formed, for example, of synthetic resin. The shock-absorbing member 30 covers, e.g., surrounds the HDD 10 and the case 20. The shock-absorbing member 30 is, in the example of FIG. 2, formed of an elastically deformable metal. The restraining bodies 40, switch the state of the shock-absorbing member 30. The shock-absorbing member 30 and the restraining bodies 40 correspond to a shock-absorbing device. The HDD 10 and the case 20 correspond to an object of shock absorption.

The HDD 10 may be fixed to the case 20 with screws. The case 20 includes a bottom wall 22, a front wall 23, and two side walls 24. The top surface 11 of the HDD 10 may be exposed from the case 20. The front wall 23 may be provided with a lever 28. The lever 28 is openable and closable with respect to the front wall 23. The lever 28 may be supported rotatably about a pivot 285. In addition, the front wall 23 includes a protruding wall 231. The protruding wall 231 includes an engaging hole 233. The lever 28 includes a tab 281 at the tip thereof. In addition, the lever 28 includes an engaging portion 283 that engages with the engaging hole 233 when the lever 28 is closed. The lever 28 corresponds to a pressing portion and an opening and closing body.

The shock-absorbing member 30 includes an upper portion 31, a lower portion 32, a front portion 33, and two side portions 34. The front portion 33 is located at the front end of the shock-absorbing member 30. The side portions 34 are located at the back end of the shock-absorbing member 30. In the upper portion 31, the lower portion 32, and the front portion 33, a plurality of holes may bee formed in order to facilitate the elastic deformation and to reduce the weight. In each of the side portions 34, an engaging hole 35 may be formed.

The restraining bodies 40 engage with the engaging holes 35 formed in the side portions 34. Each restraining body 40 includes a thin portion 41, a tip portion 42, and a bent portion 43. The thin portion 41 is slightly thinner than the tip portion 42. On the thin portion 41, a substantially circular engaging protrusion 45 is formed. In the lower part of the tip portion 42, a sloping portion 48 is formed. The bent portion 43 is bent substantially perpendicularly to the tip portion 42.

Figure 3A:
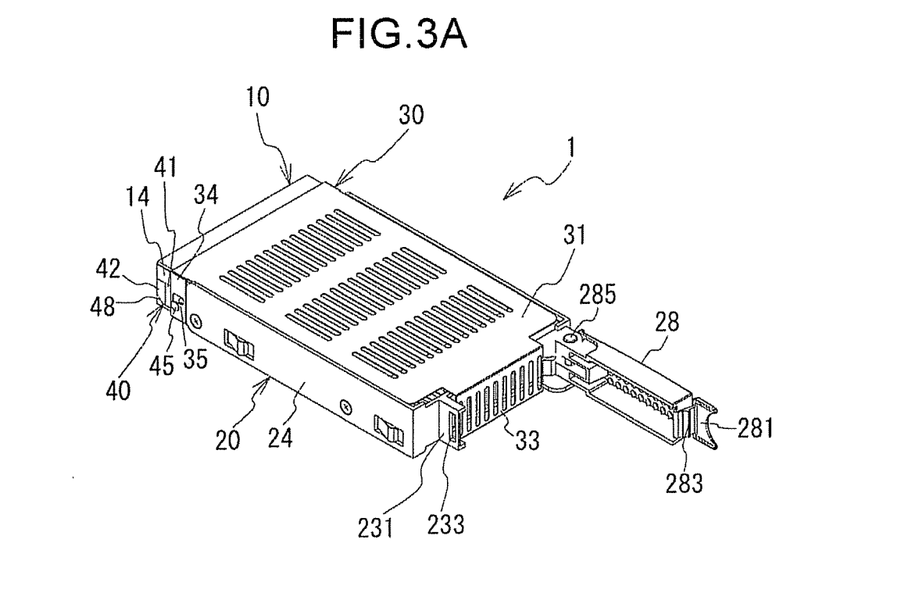
FIGS. 3A and 3B illustrate a HDD unit.
Figure 3B:
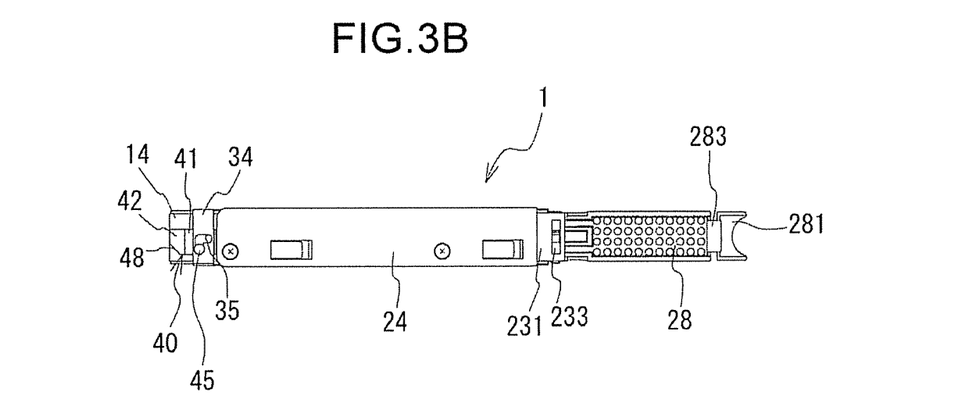

FIGS. 3A and 3B illustrate an HDD unit 1. FIGS. 3A and 3B illustrate a state where lever 28 is open.

The shock-absorbing member 30 covers the HDD 10 and the case 20. When the shock-absorbing member 30 covers, e.g., surrounds the HDD 10 and the case 20, the front portion 33 and the front wall 23 face each other, and the top surface 11 and the upper portion 31 face each other. The lower portion 32 is not in contact with the bottom wall 22. The shock-absorbing member 30 may be slidable, for example, in the longitudinal direction relative to the HDD 10 and the case 20.

Each restraining body 40 s located between a corresponding one of the side portions 34 and a corresponding one of the side surfaces 14 of the HDD 10. In FIG. 3A, the engaging hole 35 and the engaging protrusion 45 are engaged with each other. In FIG. 3A, the bent portion 43 and the end of the side wall 24 are in contact with each other. The posture of the restraining body 40 is thereby maintained. As illustrated in FIG. 3B, when the lever 28 is open, the upper portion 31 and the lower portion 32 (not illustrated) are substantially flat. Therefore, the gap between each of the upper portion 31 and the lower portion 32 (not illustrated) and the HDD 10 is small.

Figure 4A:
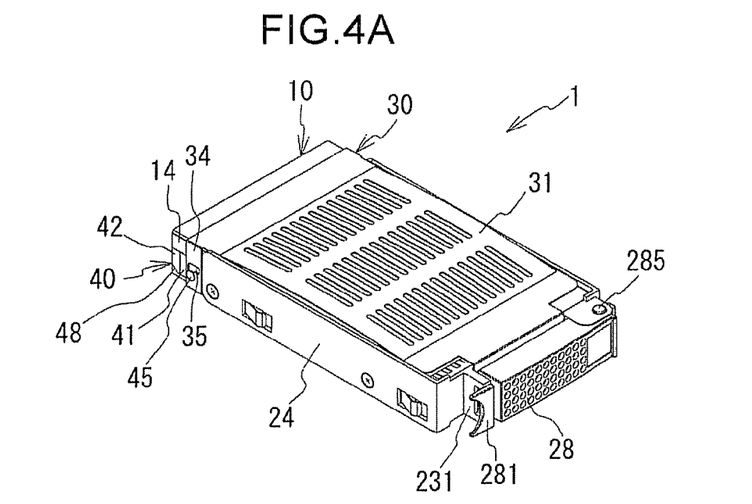
FIGS. 4A and 4B illustrate a HDD unit with a shock-absorbing member in a bent state.
Figure 4B:
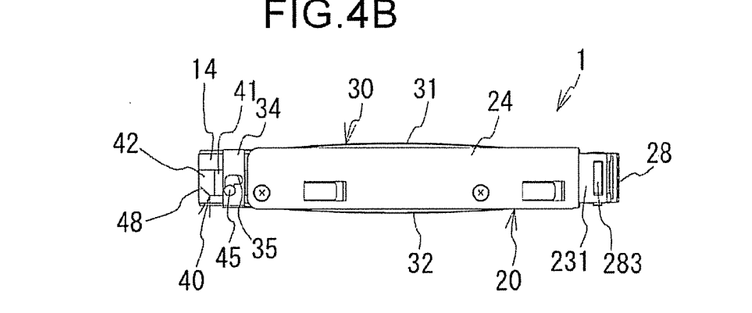

FIGS. 4A and 4B illustrate an HDD unit 1 with the shock-absorbing member 30 in a bent state.

Closing the lever 28 engages the engaging portion 283 and the engaging hole 233 with each other. The front portion 33 is thereby pressed in the longitudinal direction of the shock-absorbing member 30, and the front portion 33 and the front wall 23 come into contact with each other. The restraining bodies 40 restrain the shock-absorbing member 30 from being slid by the pressure of the lever 28. Therefore, the shock-absorbing member 30 is compressed by the lever 28 and the restraining bodies 40, and the upper portion 31 and the lower portion 32 are bent, for example, away from an outer surface of the HDD 10, as illustrated in FIGS. 4A and 4B.

Bending the shock-absorbing member 30 increases the gap between each of the upper portion 31 and the lower portion 32 and corresponding surfaces of the HDD 10. The shock-absorbing member 30 is elastically deformable and protects the HDD 10 and the case 20 from shock by bending outward with respect to the HDD 10. For example, when carrying the HDD unit 1, the HDD 10 and the case 20 can be protected from shock by bringing the shock-absorbing member 30 into the bent state. Bending the shock-absorbing member 30 increases the thickness of the HDD unit 1. When giving priority to shock absorption, the shock-absorbing member 30 may be brought into the bent state.

Figure 4C:
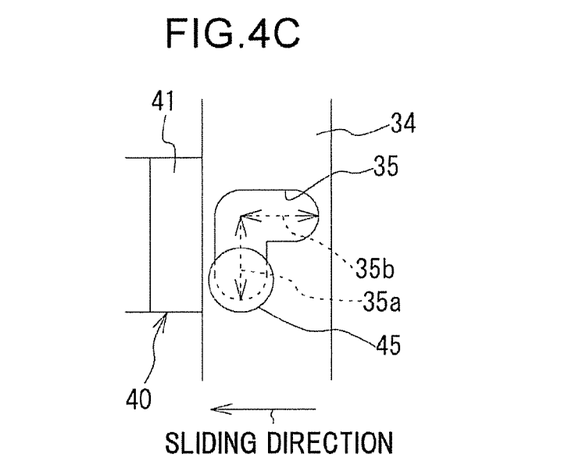
FIG. 4C illustrates an engaging hole.

FIG. 4C illustrates the engaging hole 35 in a bent state where the shock-absorbing member 30 is bent. The engaging hole 35 is substantially L-shaped and imay be formed in the side portion 34. The engaging hole 35 includes a first region 35a that extends substantially vertically and a second region 35b that extends substantially horizontally. The first region 35a and the second region 35b are substantially perpendicular to each other. When the shock-absorbing member 30 is in the bent state, the engaging protrusion 45 is located at the lower end of the first region 35a. Therefore, in the bent state, the restraining body 40 is located at the lowest position with respect to the shock-absorbing member 30. By locating the engaging protrusion 45 at the lower end of the first region 35a, the shock-absorbing member 30 is restrained from being slid by the pressure of the lever 28.

Figure 5A:
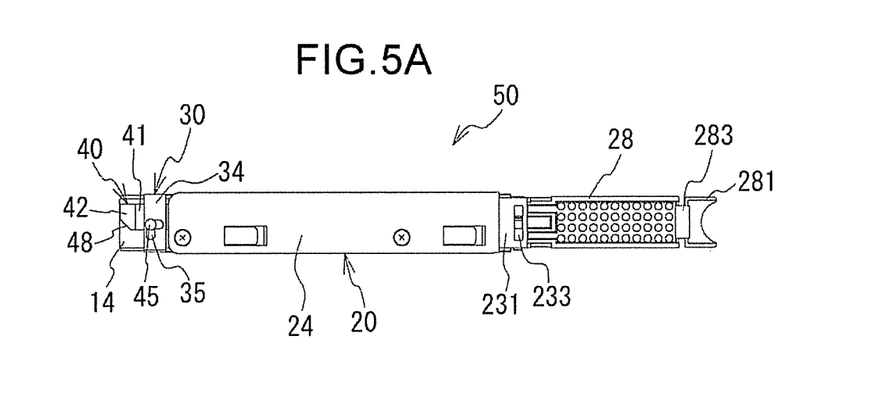
FIGS. 5A and 5B illustrate a HDD unit with a shock-absorbing member in a flat state.
Figure 5B:
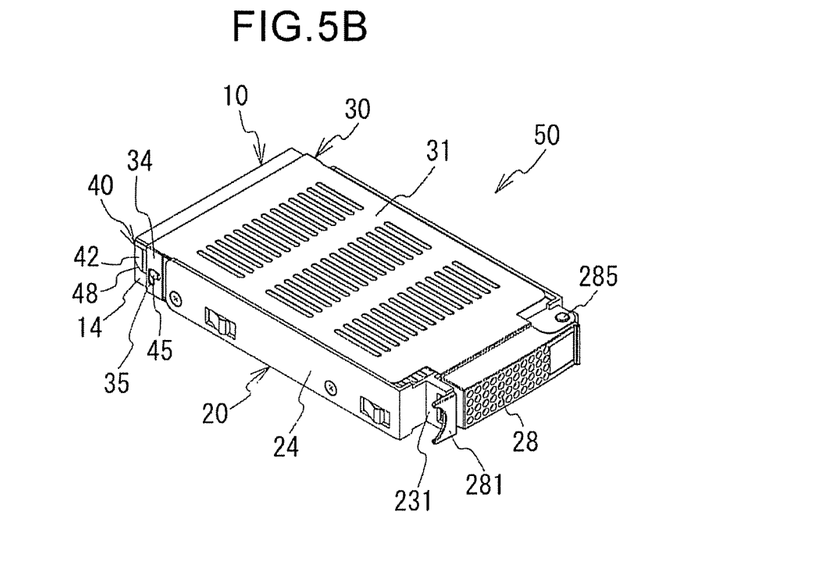

FIGS. 5A and 5B illustrate views of an HDD unit 50 with the shock-absorbing member 30 in the flat state. FIG. 5A illustrates the state where the lever 28 is open.

As illustrated in FIG. 5A, the position of the engaging protrusion 45 in the engaging hole 35 is different from that illustrated in FIG. 4C. As the lever 28 in the state illustrated in FIG. 5A is closed, the shock-absorbing member 30 is pressed and slid by the lever 28, and is brought into the state illustrated in FIG. 5B. As illustrated in FIG. 5B, even when the lever 28 is closed, the shock-absorbing member 30 is maintained in the flat state. In the flat state, the shock-absorbing effect of the shock-absorbing member 30 on the HDD 10 and the case 20 is small. The thickness of the HDD 50 when the shock-absorbing member 30 in the flat state is thin compared to when the shock-absorbing member 30 in the bent state. Accordingly, when n giving priority to size reduction, the shock-absorbing member 30 may be brought into the flat state.

Figure 6A:
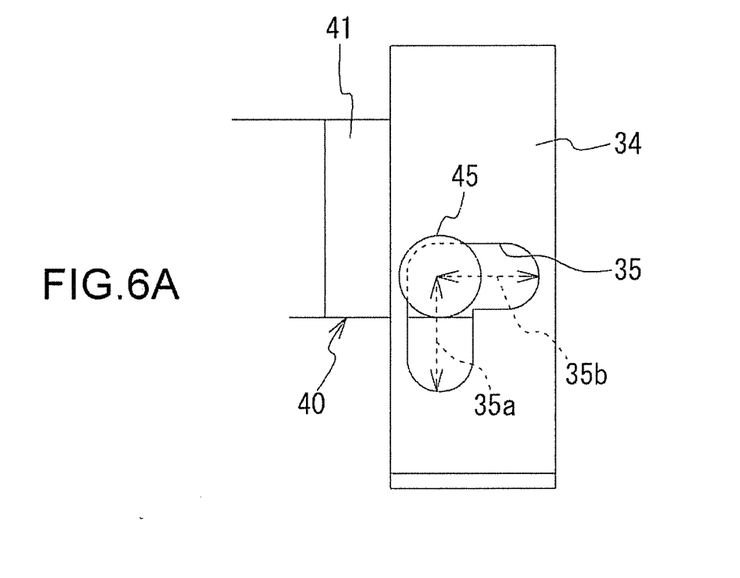
FIGS. 6A and 6B illustrate an engaging hole in the flat state.
Figure 6B:
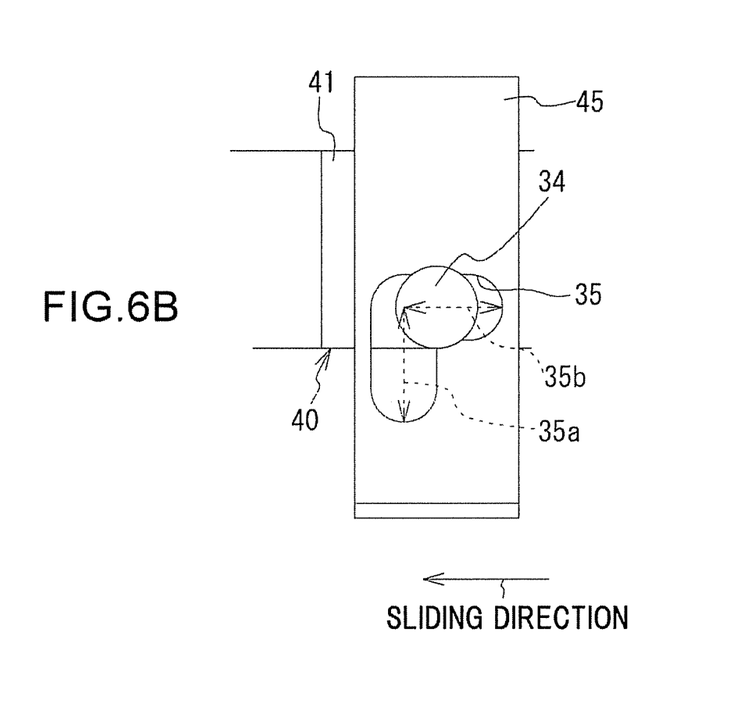

FIGS. 6A and 6B illustrate views of the engaging hole 35 in the flat state. FIG. 6A illustrates the state before the lever 28 is closed, and FIG. 6B illustrates the state after the lever 28 is closed.

In FIG. 6A, the engaging protrusion 45 is located between the first region 35a and the second region 35b. As the lever 28 is closed, the engaging protrusion 45 relatively moves in the second region 35b. This allows the shock-absorbing member 30 to slide, and the engaging protrusion 45 is located in the second region 35b as illustrated in FIG. 6B. Since the shock-absorbing member 30 is allowed to be slid by the pressure of the lever 28, the shock-absorbing member 30 is maintained flat without bending. The restraining bodies 40 switch the shock-absorbing member 30 to the bent state or the flat state according to the positional relationship with the shock-absorbing member 30.

Figure 7A:
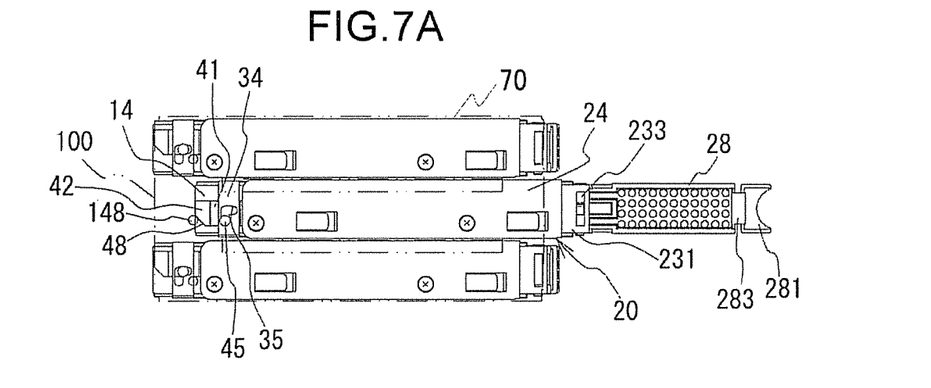
FIGS. 7A and 7B illustrate insertion of a HDD unit.
Figure 7B:
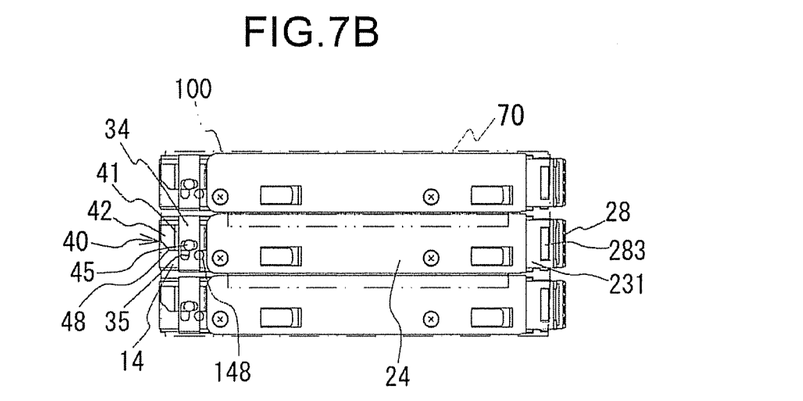

FIGS. 7A and 7B illustrate insertion of an HDD unit 70. When inserting the HDD unit 70 into the chassis 100, the levers 28 are open. Inserting the HDD unit 70 with the lever 28 open into the chassis 100 brings the sloping portion 48 of the restraining body 40 into contact with the protrusion 148, as illustrated in FIG. 7A. Owing to the protrusion 148, further insertion of the HDD unit 70 moves the restraining body 40 upward with respect to the shock-absorbing member 30. For example, the engaging protrusion 45 moves from a position illustrated in FIG. 4C (the lower end of the first region 35a) to a position illustrated in FIG. 6A. Since the shock-absorbing member 30 is allowed to slide, the shock-absorbing member 30 may be maintained in the flat state even after the lever 28 is closed.

Since the shock-absorbing member 30 is maintained in the flat state when the HDD unit is inserted, many HDD units can be enclosed in a limited space. In a case where an HDD unit is not enclosed in the chassis 100, the HDD unit can be stably placed by bringing the shock-absorbing member 30 into the flat state.

An HDD unit according to an exemplary embodiment can be switched between a state where priority is given to shock absorption and a state where priority is given to size reduction. In the state where priority is given to size reduction, the shock-absorbing member is in a flat state, and therefore the size of the HDD unit including the shock-absorbing member can be kept relatively small.

The shock-absorbing member can be switched to a bent state or a flat state according to the position of each restraining body relative to the shock-absorbing member. Therefore, the state of the shock-absorbing member can be switched with a simple operation.

As an example, shock to an object may be s absorbed by using an air cushion surrounding the object. By discharging air from the air cushion or introducing air into the air cushion, switching can be performed to a state where shock to the object is absorbed or to a state where shock to the object is not absorbed. However, it may be difficult to discharge air from the air cushion or to introduce air into the air cushion with a simple operation. In addition, it may be difficult to discharge air from the air cushion or to introduce air into the air cushion in a short time. According to an exemplary embodiment, switching can be easily performed to a state where shock is absorbed or a state where shock is not absorbed, simply by changing the position of each restraining body 40 and closing the lever 28.

The shock-absorbing member 30 is pressed by the lever 28. By pressing the shock-absorbing member 30 with the lever 28, the shock-absorbing member 30 can be brought into the bent state with a small force.

When the lever 28 is open, that is, when the lever 28 is not pressing the shock-absorbing member 30, the position of each restraining body 40 relative to the shock-absorbing member 30 can be easily changed.

Although an exemplary embodiment of the present invention have been described in detail, the present invention is not limited to the specific embodiment, and various changes and modifications may be made therein without departing from the scope or spirit of the present invention as defined in the appended claims.

The object protected from shock is not limited to a storage medium. Although the lever 28 may be provided in the case 20, a pressing member may be used that is provided separately from the case 20 and that can press the shock-absorbing member 30 in the sliding direction by engaging with the case 20.

Examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present invention has been described in detail, it should be understood that the various changes, substitutions, and alterations could be made hereto without departing from the spirit and scope of the invention. Further, according to an aspect of the embodiments, any combinations of the described features, functions and/or operations can be provided.

The many features and advantages of the embodiments are apparent from the detailed specification and, thus, it is intended by the appended claims to cover all such features and advantages of the embodiments that fall within the true spirit and scope thereof. Further, since numerous modifications and changes will readily occur to those skilled in the art, it is not desired to limit the inventive embodiments to the exact construction and operation illustrated and described, and accordingly all suitable modifications and equivalents may be resorted to, falling within the scope thereof.

What is claimed is:

1. A shock-absorbing device that absorbs shock to an object comprising:
    a shock-absorbing member that surrounds the object and is elastically deformable; and
    a switching mechanism that switches the shock-absorbing member to a flat state where a gap between the shock-absorbing member and the object is small and the shock-absorbing member is flat, or to a bent state where the shock-absorbing member is bent toward the outside of the object so that the gap increases,
    wherein the shock-absorbing member is slidable in a predetermined direction relative to the object, and the switching mechanism includes a pressing portion that presses the shock-absorbing member in the predetermined direction and a restraining portion that brings the shock-absorbing member into the flat state by allowing the shock-absorbing member to be slid by the pressing portion relative to the object or that brings the shock-absorbing member into the bent state by restraining the shock-absorbing member from being slid by the pressing portion.

2. The shock-absorbing device according to claim 1, wherein the restraining portion includes a restraining body that is engaged with the shock-absorbing member in such a manner that a positional relationship therebetween can be changed and that switches the shock-absorbing member to the flat state or the bent state according to the positional relationship.

3. The shock-absorbing device according to claim 1, wherein the pressing portion includes an opening and closing body that is connected to the object openably and closably and that presses the shock-absorbing member when closed.

4. The shock-absorbing device according to claim 2, wherein when the shock-absorbing device is inserted into an enclosing device, the restraining body comes into contact with a contact portion provided in the enclosing device, and the positional relationship is thereby changed.

5. The shock-absorbing device according to claim 2, wherein the positional relationship can be changed when the pressing portion is not pressing the shock-absorbing member.

* * * * *